Patented Oct. 16, 1951

2,571,775

UNITED STATES PATENT OFFICE 2,571,775

PYRRO-COLINOCARBOCYANINE DYES AND PROCESS FOR THE PREPARATION THEREOF

Robert H. Sprague, Rochester, N.Y., assignor to Eastman Kodak Company, Rochester, N. Y., a corporation of New Jersey No Drawing. Application April 3, 1948, Serial No. 18,863

11 Claims. (Cl. 260—240.65)

This invention relates to pyrrocolinocarbocyanine dyes and to a process for the preparation thereof.

Certain pyrrocolinocarbocyanine dyes are known and these have been prepared by heating a pyrrocoline with β-anilinoacrolein anil hydrochloride, sodium bromide and acetic anhydride. I have now found that pyrrocolinocarbocyanine dyes can be prepared by condensing a pyrrocoline with a 1,3,3-trialkoxypropene, in the presence of a metal salt and a substantially anhydrous carboxylic acid. Contrasted with this, cyclammonium quaternary salts containing a reactive methyl group condense with 1,3,3-trialkoxypropenes (β-alkoxyacrolein acetals), in glacial acetic acid, to give not dicarbocyanine dyes, but rather cyclammonium quaternary salts containing a 4-alkoxy-1,3-butadienyl group. Moreover, I have found that pyrrocolines do not condense with 1,3,3-trialkoxypropenes, in the presence of a metal salt and acetic anhydride to give pyrrocolinocarbocyanine dyes. My new process is especially useful for the preparation of pyrrocolinocarbocyanine dyes from pyrrocolines containing an aryl group in the 2- or 3-positions or both.

It is, accordingly, an object of my invention to provide a new process for preparing pyrrocolinocarbocyanine dyes. A further object is to provide new pyrrocolinocarbocyanine dyes. Other objects will become apparent hereinafter.

In accordance with my invention, I prepare pyrrocolinocarbocyanine dyes by condensing a 1,3,3-trialkoxypropene, e. g. 1,3,3-trimethoxypropene, 1,3,3-triethoxypropene, etc., in the presence of a substantially anhydrous carboxylic acid and a metal salt of an acid which is stronger than the carboxylic acid, with a pyrrocoline (i. e. an indolizine) selected from the group consisting of those represented by the following general formula:

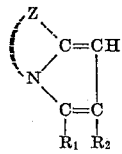

wherein $R_1$ and $R_2$ each represents a member selected from the group consisting of a hydrogen atom, an alkyl group, e. g. methyl, ethyl, n-propyl, n-butyl, n-hexyl, isobutyl, and an aryl group, e. g. phenyl, and Z represents the non-metallic atoms necessary to complete a heterocyclic nucleus of the pyridine series.

As the substantially anhydrous carboxylic acid, glacial acetic acid is advantageously employed. Substantially anhydrous propionic, butyric and isobutyric acids can also be employed, though usually less advantageously.

As metal salts, the alkali metal salts, especially sodium and potassium salts, are advantageously employed. Calcium, strontium, and barium salts can be employed. The anion in the salt is advantageously a monovalent anion, especially bromide or perchlorate. Salts containing nitrate, chloride, iodide and sulfate anions can also be employed, though usually less advantageously.

The following examples will serve to illustrate further the manner of obtaining pyrrocolinocarbocyanine dyes in accordance with my invention.

*Example 1.*—2,3,2',3'-tetraphenyl-1,1'-pyrrocolinocarbocyanine bromide

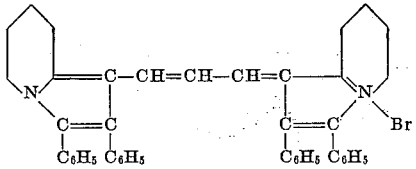

10.8 g. (2 mols.) of 2,3-diphenyl pyrrocoline, 5.3 g. (1 mol.+100% excess) of 1,3,3-trimethoxypropene, 5.0 g. (1 mol.+excess) of potassium bromide and 50 cc. of glacial acetic acid were boiled together under reflux for five minutes. Green crystals of dye separated out rapidly from the blue solution. The reaction mixture was chilled to 0° C. and the product collected on a suction filter. The dye was washed on the filter with 25 cc. of water and 25 cc. of acetone and dried. The yield of coppery crystals was 10.3 g., 79 per cent. After recrystallization from absolute ethyl alcohol (30 cc. per gram of dye) the product was obtained in the form of green crystals with a golden metallic reflex. The purified dye melted at 212-214° C. with decomposition. The yield of purified material was 8.5 g., 65 per cent. The dye gave a blue-green alcohol solution which was bleached by Eastman Kodak Company's "D-76" developer.

*Example 2.* — 2,2' - di - p-carboxyphenyl-3,3'-dimethyl-1,1'-pyrrocolinocarbocyanine perchlorate

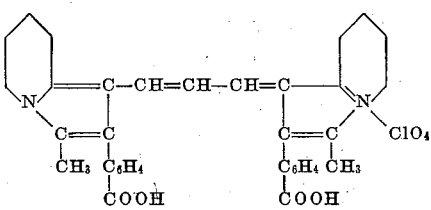

1.25 g. (2 mols.) of 2-p-carboxyphenyl-3-methyl pyrrocoline, .8 g. (1 mol.+100%) of 1,3,3-trimethoxypropene, .7 g. (1 mol.+excess) of sodium perchlorate and 25 cc. of glacial acetic acid were boiled together under reflux for five minutes. The blue reaction mixture was chilled to 0° C., the dye collected on a suction filter, washed on the filter with water and acetone and dried. The yield of green crystals was .8 g., 50 per cent. After recrystallization from methyl alcohol (125 cc. per gram of dye) the product was obtained in the form of minute green crystals which melted at 282–284° C. with decomposition.

*Example 3.— 2,3,2',3' - tetramethyl-1,1'-pyrrocolinocarbocyanine bromide*

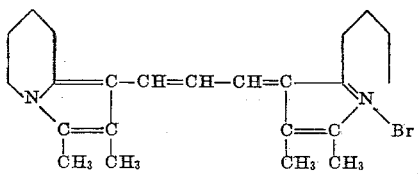

This dye can be prepared as in Example 1, using 2,3-dimethylpyrrocoline instead of 2,3-diphenylpyrrocoline. It was obtained as blue green crystals melting at 273 to 274° C.

In the manner illustrated in the foregoing examples, 2,2'-diphenyl-1,1' - pyrrocolinocarbocyanine bromide and perchlorate can be prepared from 2-phenylpyrrocoline, 2,2'-dimethyl-1,1'-pyrrocolinocarbocyanine bromide and perchlorate can be prepared from 2-methylpyrrocoline, etc.

Several of the pyrrocolines employed in practicing our invention are known compounds. Several of the pyrrocolines can be prepared by heating an α-picoline quaternary salt selected from those represented by the following general formula:

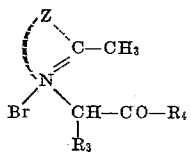

wherein Z has the values given above, and $R_3$ and $R_4$ each represents a member selected from the group consisting of methyl, ethyl, benzyl (phenylmethyl), phenyl, p - cyanophenyl, p-chlorophenyl, etc., in the presence of an acid-binding agent, e. g. an alkali metal carbonate, e. g. sodium or potassium carbonate. The α-picoline quaternary salts can be formed by heating the α-picoline with the appropriate α-bromoketone, e. g. α-bromoethyl methyl ketone, α-bromo-p-cyanopropiophenone, desyl bromide, etc. The following examples will serve to illustrate further the preparation of pyrrocolines by the aforesaid method.

*Example 4.—2,3-diphenylpyrrocoline*

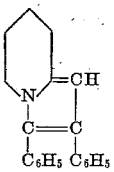

A hot solution of 17.5 g. of sodium carbonate in 1 liter of water was added, with stirring, to a hot solution of 50.2 g. of α-picoline desobromide in 1500 cc. of water. The reaction mixture was kept at 95° C. for one hour, then it was chilled and the product was collected on a filter and washed with water. The 2,3-diphenylpyrrocoline was recrystallized from 100 cc. of acetone. The light gray crystals weighed 28 g.

The α-picoline desobromide used in the above example was prepared as follows:

50 g. of α-picoline and 91.7 g. of desyl bromide were heated together at 125° C. for one hour. The cake of quaternary salt was ground to a fine crystalline mass. The colorless crystals, after being washed on the filter with acetone, weighed 65.5 g.

*Example 5.—2-p-carboxyphenyl-3-methylpyrrocoline*

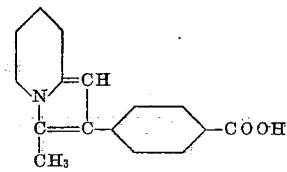

6.1 g. of 2-p-cyanophenyl-3-methylpyrrocoline was heated with 30 cc. of concentrated hydrochloric acid in a sealed tube at 135° C. for 16 hours. The solution was decanted from a small amount of tarry material and it was diluted with 600 cc. of cold water. The solid was collected on a filter, dissolved in dilute sodium carbonate solution and reprecipitated with acetic acid. The yield of gray crystals was 4.7 g.

The 2-p-cyanophenyl-3-methylpyrrocoline employed above was prepared as follows:

A solution of 5.0 g. of sodium carbonate in 100 cc. of water was added to 10.0 g. of α-picoline p-cyano-α-methylphenacobromide in 600 cc. of water and the reaction mixture was heated at the boiling point, with stirring, for 10 minutes. The light colored crystals were collected on a filter and washed with water. The intermediate, thus obtained, weighed 6.6 g., had melting point 181–183° C. and it was used without further purification.

The α-picoline p-cyano-α-methylphenacobromide employed above was prepared as follows:

10 cc. of α-picoline and 11.0 g. of α-bromo-p-cyanopropiophenone were heated together at the temperature of the steam bath for 15 minutes. At first, a clear solution was obtained, then solid separated, and the reaction mixture began to darken. Chloroform (25 cc.) was added and the reaction mixture was allowed to stand overnight at room temperature. The quaternary salt was collected on a filter and washed with acetone. The pale greenish crystals weighed 10.6 g.

The α-bromo-p-cyanopropiophenone employed above was prepared as follows:

13.1 g. of p-cyanopropiophenone and 300 cc. of anhydrous ether were placed in a 500 cc. three-necked flask, fitted with a stirrer, reflux condenser and dropping funnel. After chilling the solution in an ice-bath, 0.2 g. of anhydrous aluminum chloride was added and then 13.2 g. of bromine was added slowly from the dropping funnel. After stirring for 10 minutes, the ether was removed under reduced pressure. The crystalline residue was transferred to a funnel and washed first with 50 cc. of water and then 50 cc. of petroleum ether. The product was recrystallized from 300 cc. of ligroin (boiling point 90–120° C.). The nearly colorless crystals weighed 11.6 g. and had melting point 60–61° C.

The p-cyanopropiophenone employed above was prepared as follows:

A solution containing 125 g. of crystallized copper sulfate and 32.5 g. of sodium chloride in 400 cc. of hot water was placed in a 2 liter flask fitted with a stirrer. To this solution was added, over a period of 10 minutes, an alkaline solution of sodium sulfite (26.5 g. of sodium bisulfite and 17.5 g. of sodium hydroxide in 300 cc. of water). The mixture was allowed to cool to room temperature and the white cuprous chloride was washed by decantation with cold water. To the suspension of cuprous chloride in 300 cc. of water was added, with stirring, a solution of 65 g. of sodium cyanide in 150 cc. of water. The cuprous chloride went into solution with the evolution of considerable heat and then the mixture was cooled in a cold water bath. In a 5 liter three-necked flask, fitted with a stirrer and dropping funnel, was placed 58 g. of p-aminopropiophenone, 100 cc. of concentrated hydrochloric acid, 500 cc. of water and enough ice to lower the temperature of the mixture to 0° C. The suspension of p-aminopropiophenone hydrochloride was stood in an ice-bath and a solution of 28 g. of sodium nitrite in 100 cc. of water was added, with stirring, at such a rate the temperature of the reaction mixture was kept at 0° to 5° C. A distinct and permanent reaction for free nitrous acid was given with starch-iodide paper. The mixture was cautiously neutralized by adding, with stirring, anhydrous sodium carbonate. Litmus paper was used to determine the endpoint. The suspension of cuprous cyanide and 500 cc. of benzene were placed in a 3 liter three-necked flask. The flask was placed in an ice-bath. The cold neutralized suspension of the diazonium salt was added slowly, with stirring, to the cold (0° to 5° C.) suspension of cuprous cyanide and then the stirring was continued for 30 minutes. The reaction mixture was heated to 60° C. and then it was allowed to stand about 65 hours at room temperature. The benzene layer was collected, and the reaction mixture was extracted twice with benzene (500 cc. each time). The benzene extracts were heated to the boiling point, filtered, and the combined filtrates were fractionated. The fraction distilling at 160–162° C./8 mm. solidified as nearly colorless crystals. The yield of p-cyanopropiophenone was 13.1 g.

The dye-bromides can be converted to the dye-iodides by treating a hot methyl alcoholic solution of the dye-bromide with a concentrated aqueous solution of potassium iodide. The dye-iodides can be converted to dye-chlorides by heating the dye-iodide with a suspension of silver chloride in a phenol according to the process set forth by Brooker in United States Patent 2,245,249, dated June 10, 1941. Using a methyl alcohol suspension of silver acetate, the dye-acetate can be formed. Using a methyl alcohol suspension of silver thiocyanate the dye-thiocyanate can be used. Using a methyl alcohol suspension of silver sulfamate, the dye-sulfamate can be formed.

The pyrrocoline carbocyanine dyes described herein can be employed as light screening substances in photographic elements. Such light screening substances are often required in overcoatings upon photographic elements to protect the light sensitive emulsion or emulsions from the action of light which it is not desired to record; in layers arranged between differentially color-sensitized emulsions and in backings forming the so-called anti-halation layers on either side of a transparent support carrying the light sensitive emulsion or emulsions. For the preparation of overcoating layers, filter layers and anti-halation layers, according to my invention, from 50 mg. to 150 mg. of dye are dissolved in from 2 to 5 cc. of a water-miscible solvent. Methanol or acetone are suitable for this purpose, but pyridine or β-ethoxyethyl alcohol may also be used. The solution is then added to about 25 cc. of a 5 per cent gelatin support at 40° C. and the mixture coated on the support.

The dyes obtained from 2,3-diaryl pyrrocolines are more stable to light, deeper in color and more resistant to diffusion than the dyes obtained from 2,3-dialkylpyrrocolines.

What I claim as my invention and desire to be secured by Letters Patent of the United States is:

1. A process for preparing a pyrrocolinocarbocyanine dye comprising condensing, in the presence of a substantially anhydrous carboxylic acid containing from 2 to 4 carbon atoms and a metal salt selected from the group consisting of the alkali and the alkaline earth metal bromides, perchlorates, nitrates, chlorides, iodides and sulfates, a 1,3,3-trialkoxypropene in which each alkyl group contains from 1 to 2 carbon atoms with a pyrrocoline selected from the group consisting of those represented by the following general formula:

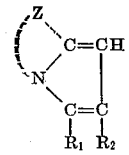

wherein R₁ and R₂ each represents a member selected from the group consisting of a hydrogen atom, an alkyl group containing from 1 to 6 carbon atoms and an aryl group of the benzene series, and Z represents the non-metallic atoms necessary to complete a heterocyclic nucleus of the pyridine series.

2. A process for preparing a pyrrocolinocarbocyanine dye comprising condensing, in the presence of substantially anhydrous acetic acid and an alkali metal perchlorate, 1,3,3-trimethoxypropene with 2-p-carboxyphenyl-3-methylpyrrocoline.

3. A process for preparing a pyrrocolinocarbocyanine dye comprising condensing, in the presence of substantially anhydrous acetic acid and sodium perchlorate, 1,3,3-trimethoxypropene with 2-p-carboxyphenyl-3-methylpyrrocoline.

4. A process for preparing a pyrrocolinocarbocyanine dye comprising condensing, in the presence of substantially anhydrous acetic acid and an alkali metal bromide, 1,3,3-trimethoxypropene with 2,3-diphenylpyrrocoline.

5. A process for preparing a pyrrocolinocarbocyanine dye comprising condensing, in the presence of substantially anhydrous acetic acid and sodium bromide, 1,3,3-trimethoxypropene with 2,3-diphenylpyrrocoline.

6. A process for preparing a pyrrocolinocarbocyanine dye comprising condensing, in the presence of substantially anhydrous acetic acid and potassium bromide, 1,3,3-trimethoxypropene with 2,3-diphenylpyrrocoline.

7. A process for preparing a pyrrocolinocarbocyanine dye comprising condensing, in the presence of substantially anhydrous acetic acid and an alkali metal bromide, 1,3,3-trimethoxypropene with 2,3-dimethylpyrrocoline.

8. A process for preparing a pyrrocolinocarbocyanine dye comprising condensing, in the presence of substantially anhydrous acetic acid and potassium bromide, 1,3,3-trimethoxypropene with 2,3-dimethylpyrrocoline.

9. The pyrrocolinocarbocyanine dyes which are represented by the following general formula:

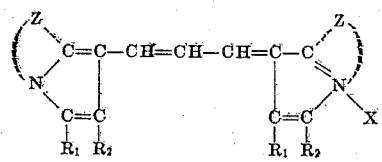

wherein $R_1$ and $R_2$ each represents an aryl group of the benzene series, X represents an anion selected from the group consisting of bromide, perchlorate, nitrate, chloride, iodide and sulfate, and Z represents the non-metallic atoms necessary to complete a heterocyclic nucleus of the pyridine series.

10. The pyrrocolinocarbocyanine dye which is represented by the following formula:

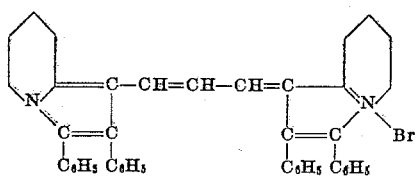

11. The pyrrocolinocarbocyanine dye which is represented by the following general formula:

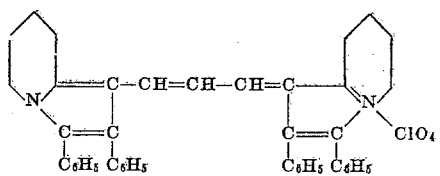

ROBERT H. SPRAGUE.

REFERENCES CITED

The following references are of record in the file of this patent:

UNITED STATES PATENTS

| Number | Name | Date |
|---|---|---|
| 2,268,798 | Brooker | Jan. 6, 1942 |
| 2,269,234 | Sprague | Jan. 6, 1942 |

FOREIGN PATENTS

| Number | Country | Date |
|---|---|---|
| 529,440 | Great Britain | 1940 |

OTHER REFERENCES

Cook: Chem. Soc. J., 1944, pp. 482-492.